(12) United States Patent
Yeh et al.

(10) Patent No.: US 8,269,926 B2
(45) Date of Patent: Sep. 18, 2012

(54) DISPLAY PANEL USING LASER CUTTING TECHNOLOGY AND THE MOTHER SUBSTRATE THEREOF

(75) Inventors: Li-Ya Yeh, Kaohsiung (TW); Shu-Chih Wang, Taipei (TW)

(73) Assignee: AU Optronics Corp. (TW)

( * ) Notice: Subject to any disclaimer, the term of this patent is extended or adjusted under 35 U.S.C. 154(b) by 0 days.

(21) Appl. No.: 13/053,447

(22) Filed: Mar. 22, 2011

(65) Prior Publication Data

US 2011/0164212 A1 Jul. 7, 2011

Related U.S. Application Data

(62) Division of application No. 12/292,065, filed on Nov. 12, 2008, now Pat. No. 7,961,277.

(30) Foreign Application Priority Data

Apr. 25, 2008 (TW) .............................. 97115424 A

(51) Int. Cl.
*G02F 1/1333* (2006.01)
*G02F 1/1339* (2006.01)
(52) U.S. Cl. ........................................ 349/111; 349/153
(58) Field of Classification Search .................. 349/110, 349/111, 153, 154, 189, 190, 187
See application file for complete search history.

(56) References Cited

U.S. PATENT DOCUMENTS

| 6,580,489 B2 | 6/2003 | Choo et al. |
| 2004/0114089 A1 | 6/2004 | Do |
| 2005/0030461 A1 | 2/2005 | Ono et al. |
| 2005/0083471 A1 | 4/2005 | Ono et al. |
| 2007/0296674 A1 | 12/2007 | Aoki et al. |
| 2007/0296906 A1 | 12/2007 | Eun et al. |

FOREIGN PATENT DOCUMENTS

| CN | 101097360 | 1/2008 |
| JP | 11233680 | 8/1999 |
| TW | I285780 B | 8/2007 |
| TW | 200811564 A | 3/2008 |

OTHER PUBLICATIONS

Taiwanese Office Action in corresponding Taiwanese Application No. 097115424 dated Jun. 13, 2012.

*Primary Examiner* — Mark Robinson
*Assistant Examiner* — Michael Inadomi
(74) *Attorney, Agent, or Firm* — Bacon & Thomas, PLLC

(57) ABSTRACT

A display panel using laser cutting technology and a mother substrate thereof are provided. The display panel comprises two base plates opposite to each other, a sealant and a buffering metal layer. The sealant is disposed between the two base plates. The buffering metal layer formed on the inside surface of at least one of the two base plates is disposed along the sealant. At least a portion of the buffering metal layer is positioned outside the sealant. There is a first distance between the rim of the buffering metal layer and the edge of the base plate.

14 Claims, 9 Drawing Sheets

DISPLAY PANEL USING LASER CUTTING TECHNOLOGY AND THE MOTHER SUBSTRATE THEREOF

CROSS REFERENCE TO RELATED APPLICATIONS

This application is a divisional application of co-pending U.S. patent application Ser. No. 12/292,065, filed Nov. 12, 2008 and entitled "DISPLAY PANEL USING LASER CUTTING TECHNOLOGY AND THE MOTHER SUBSTRATE THEREOF". This application claims the benefit of Taiwan Application Serial No. 97115424, filed Apr. 25, 2008. U.S. patent application Ser. No. 12/292,065 and Taiwan Application Serial No. 97115424 are incorporated herein in their entirety by reference.

BACKGROUND OF THE INVENTION

1. Field of the Invention

The invention relates in general to a display panel and a mother substrate thereof, and more particularly to a display panel which has buffering metal layer and is capable of being cutting by laser and a mother substrate thereof.

2. Description of the Related Art

Diamond knife, water cutter knife and laser cutting are often used in glass cutting technology. During laser cutting, the heat generated by a laser source breaks glass molecular bond first and then the broken molecules are cooled down by a cooling device next. Then, the glass is divided due to thermal expansion and contraction.

Referring to both FIG. 1A and FIG. 1B. FIG. 1A illustratively shows a LCD mother substrate cut by a conventional laser cutting technology. FIG. 1B illustrates an enlarged portion of the top and the bottom mother substrates and the sealant of FIG. 1A, and the portion close to a predetermined laser cutting line. The LCD mother substrate 10 typically comprises a first mother substrate 11, a second mother substrate 13 assembled with the first mother substrate 11 by a sealant 16, and a liquid crystal layer (including numerous LC molecules) disposed therebetween. The first mother substrate 11 and the second mother substrate 13, for example, are respectively a mother substrate having a color filter layer and a mother substrate having many transistors. Many LCD panels 15 can be formed by laser cutting the first mother substrate 11 and the second mother substrate 13. Each display panel 15 has a display area 51 and an IC bonding area 53, wherein the sealant 16 is disposed around the display area 51. As indicated in FIG. 1A, the laser light C cuts the first mother substrate 11 along the predetermined laser cutting line 19 of the first mother substrate 11.

Referring to FIG. 1B, a metal black matrix or a resin black matrix 17 is normally disposed between the first mother substrate 11 and the sealant 16. In addition to the resin black matrix 17, the organic material layers disposed under the first mother substrate 11 (i.e. comprising the color filter layer) could further include an overcoat 18. During laser cutting, the laser beam 30 is normally deformed into a long ellipse whose width D30 ranges between about 1~1.4 mm. Also, the distance between the black matrix 17 and the predetermined laser cutting line 19, and the distance D16 (illustrated in FIG. 1A) between the edge of the sealant 16 and the predetermined laser cutting line 19 generally range between about 0.3~0.5 mm. As the distance may further be reduced to 0.2 mm in some special designs, the width D30 of the laser beam 30 is obviously larger than the distance. As laser cutting is a heat treatment process, the materials underneath the glass such as the sealant 16 and the organic material layer(s) will be affected by the heat generated during laser cutting on the first mother substrate 11 or the second mother substrate 13 made from glass. For example, the organic material layer(s) such as the resin black matrix 17 and the overcoat 18 of the first mother substrate 11 of FIG. 1B which can only resist about 200° C. will be affected. Furthermore, along with the advance in the industry, the distance D16 between the sealant 16 and the edge of and the predetermined laser cutting line 19 becomes shorter and shorter, the first mother substrate 11 and the second mother substrate 13 also become thinner and thinner. When laser cutting is performed on a thin glass mother substrate, the heat radiated downwards will severely affect the sealant 16, the resin black matrix 17 and the overcoat 18 (the organic material) which are positioned close to the cutting line. The sealant 16 and the organic material may be melted, cracked or peeled off, hence the LCD panel 15 is damaged and the yield of production is deteriorated.

Thus, how to avoid the heat of the laser beam damaging the sealant 16 or the organic materials of the mother substrate close to the laser cutting lines has become an imminent issue to be resolved.

SUMMARY OF THE INVENTION

The invention is directed to a display panel using laser cutting technology and a mother substrate thereof. With the disposition of a buffering metal layer, the heat of the laser light radiated under the mother substrate during laser cutting will not damage the sealant or the organic material disposed close to the cutting line. Thus, the manufactured display panel has excellent quality and product yield is increased.

According to a first aspect of the present invention, a display panel comprising a first base plate and a second base plate which are disposed opposite to each other, a sealant and a buffering metal layer is provided. The sealant is disposed between the two base plates. The buffering metal layer formed on the inside surface of at least one of the two base plates is disposed along the sealant. At least a portion of the buffering metal layer is positioned outside the sealant. There is a first distance between the rim of the buffering metal layer and the edge of the base plate.

According to a second aspect of the present invention, a liquid crystal display (LCD) mother substrate comprising many LCD panels is provided. The LCD mother substrate further comprises a first mother substrate and a second mother substrate which are opposite to each other, a sealant and a buffering metal layer. Each mother substrate has an inside surface and an outer surface. The inside surfaces of the two mother substrates are opposite to each other, and the outer surfaces of the two mother substrates respectively have a predetermined cutting line. The sealant is disposed between the inside surfaces of the two mother substrates and positioned on the inner side of the corresponding predetermined cutting line. The buffering metal layer formed on the inside surface of at least one of the two mother substrates is disposed along the sealant. At least a portion of the buffering metal layer is positioned outside the sealant. There is a first distance between the rim of the buffering metal layer and the predetermined cutting line.

In the embodiments of the invention, the first distance between the rim of the buffering metal layer and the edge of a base plate (or a predetermined cutting line) is smaller than the second distance between the rim of a resin black matrix and the edge of a base plate such as a color filter base plate. The first distance is at least 5 μm; for example, the first distance ranges between 5~300 μm, 5~200 μm, or 5~100 μm.

When the invention is used in laser cutting a thin base plate or in a structural design where the distance between the sealant and the predetermined cutting line is very tiny, the first distance between the rim of the buffering metal layer and the edge of the base plate is preferably set as 5~20 μm to avoid the sealant or the organic material disposed close to the cutting line being damaged by laser heat.

The invention will become apparent from the following detailed description of the preferred but non-limiting embodiments. The following description is made with reference to the accompanying drawings.

DETAILED DESCRIPTION OF THE INVENTION

A display panel using laser cutting technology and a mother substrate thereof are disclosed in the invention. The display panel comprises two base plates opposite to each other, a sealant and a buffering metal layer. The two base plates comprise a first base plate and a second base plate. The sealant is disposed between two base plates. The buffering metal layer disposed along the sealant is formed on the inside surface of at least one of the two base plates. At least a portion of the buffering metal layer is positioned outside the sealant. There is a first distance between the rim of the buffering metal layer and the edge of the base plate. The embodiments disclosed below are practical embodiments of the display panel and the mother substrate thereof according to the invention. However, the following embodiments are for elaborating the invention not for limiting the scope of protection of the invention which is defined in the claims of the invention. Thus, the specification and the drawings are to be regarded as an illustrative sense rather than a restrictive sense. Additionally, the drawings used for illustrating the embodiments and applications of the present invention only show the major characteristic parts in order to avoid obscuring the present invention.

First Embodiment

Figure 1A:
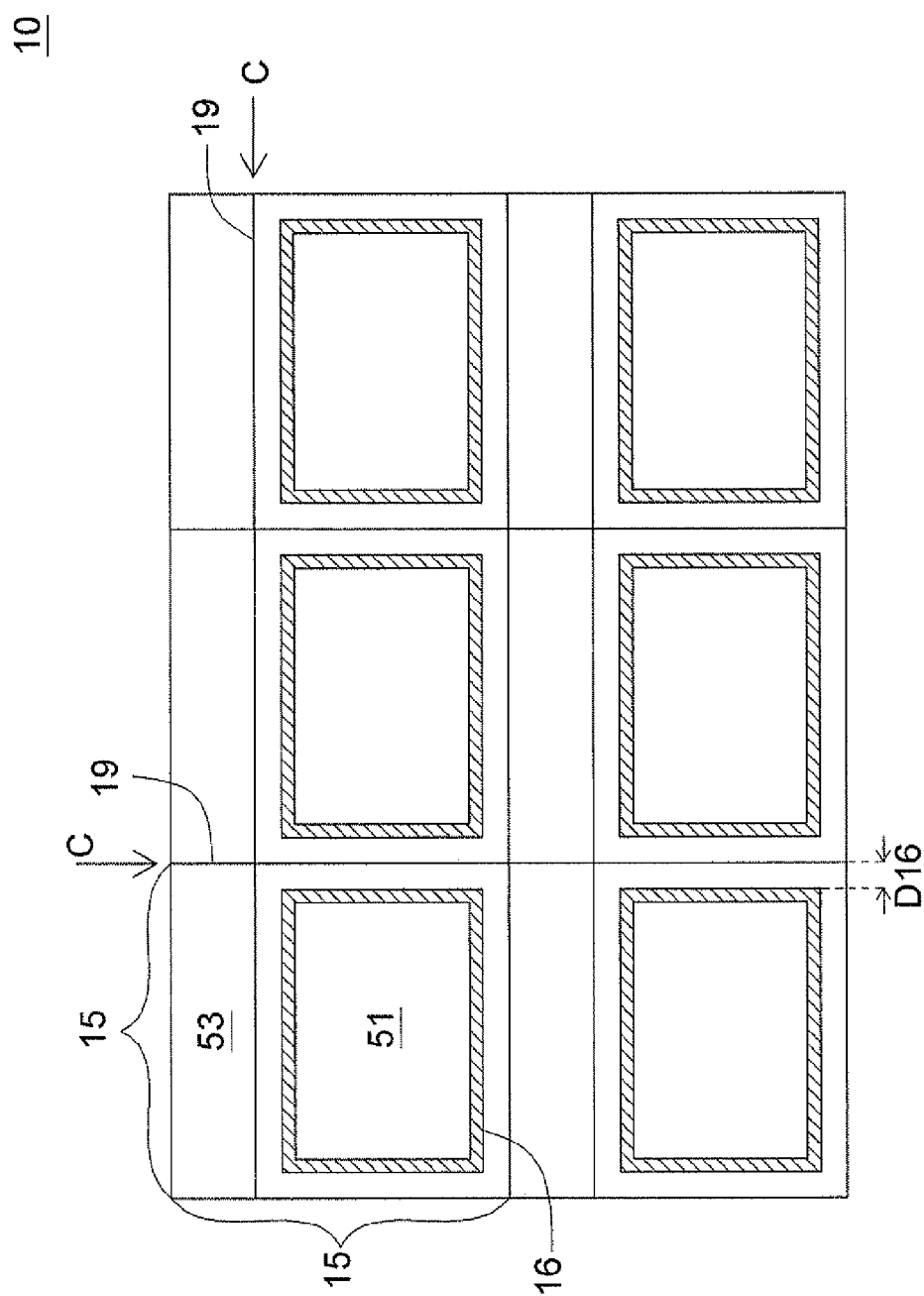
FIG. 1A (Prior Art) illustratively shows a LCD mother substrate cut by a conventional laser cutting technology.
Figure 1B:
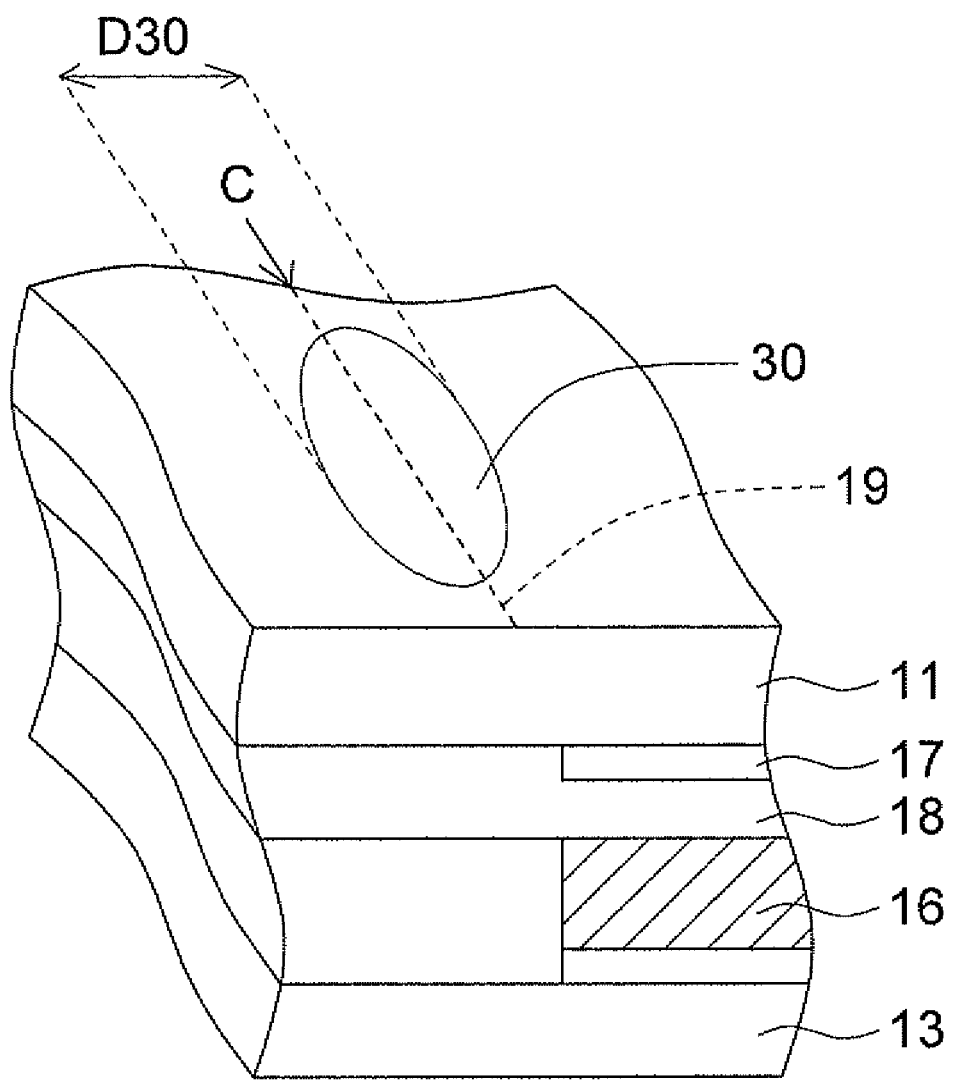
FIG. 1B (Prior Art) illustrates an enlarged portion of the top and the bottom mother substrate and the sealant of FIG. 1A, and the portion close to a predetermined laser cutting line.
Figure 2A:
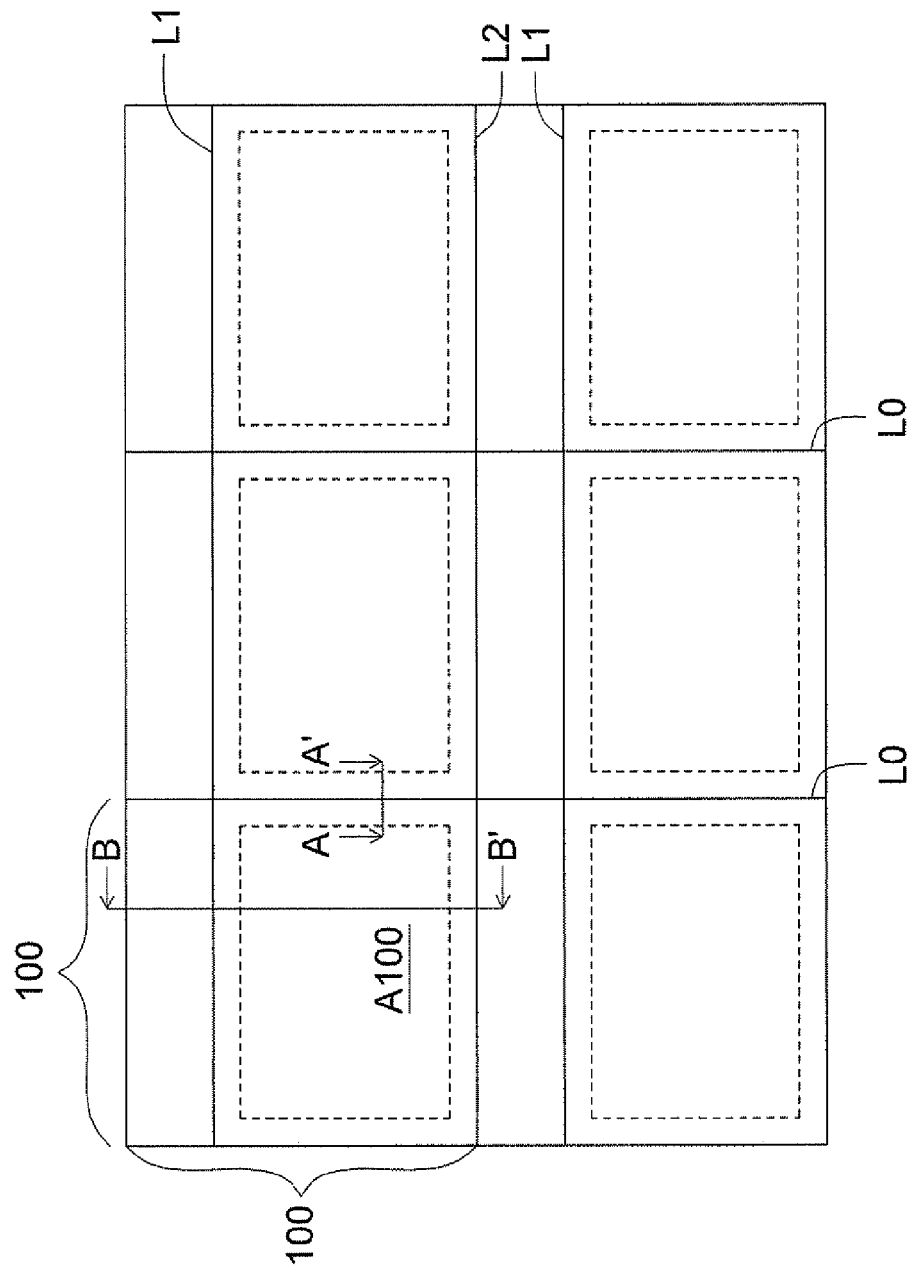
FIG. 2A shows a perspective of an LCD mother substrate according to a first embodiment of the invention.
Figure 2B:
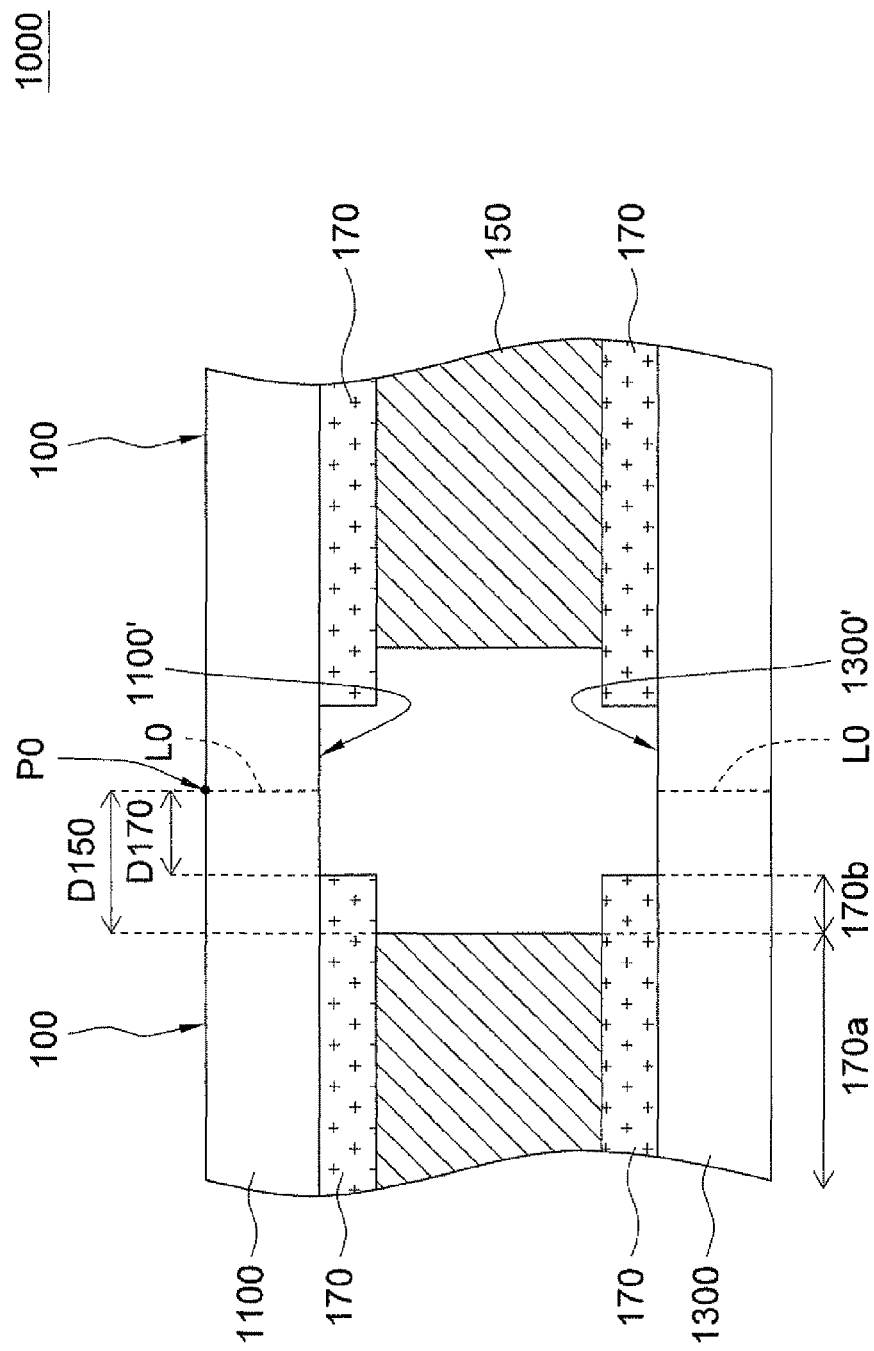
FIG. 2B shows a cross-sectional view along the segment AA' of FIG. 2A.

Referring to FIGS. 2A and 2B. FIG. 2A illustratively shows a LCD mother substrate according to a first embodiment of the invention. FIG. 2B shows a cross-sectional view along the segment AA' of FIG. 2A. The LCD mother substrate 1000 comprises two mother substrates opposite to each other, a sealant 150 and a buffering metal layer 170. The two mother substrates are a color filter mother substrate 1100 and a transistor mother substrate 1300 respectively, and the outer surfaces of the two mother substrates both have two predetermined laser cutting lines L0 and L2. Besides, the outer surface of the color filter mother substrate 1100 further has a predetermined laser cutting line L1. The sealant 150 is disposed between the two mother substrates 1100 and 1300 and positioned on the inner side of the corresponding predetermined laser cutting lines L0, L1 and L2. The buffering metal layer 170 is formed on the inside surface 1100' or 1300' of at least one of the two mother substrates 1100 and 1300, and there is a first distance D170 between the rim of the buffering metal layer 170 and the predetermined laser cutting line L0.

The LCD mother substrate 1000 comprises many display panels 100. Each display panel 100 is defined by the predetermined laser cutting lines L0, L1 and L2. Each display panel 100 has a display area A100. The sealant 150 and the buffering metal layer 170 are disposed along the rim of each display area A100. Furthermore, the sealant 150 and the buffering metal layer 170 are disposed between each display area A100 and the predetermined laser cutting lines L0, L1 and L2. In the present embodiment of the invention, the distance between the buffering metal layer 170 and the corresponding predetermined laser cutting lines L0, L1 and L2 is defined as the first distance D170. The partial area 170a of the buffering metal layer 170 is disposed along the sealant 150, and at least another partial area 170b of the buffering metal layer 170 is positioned outside the sealant 150.

Figure 3:
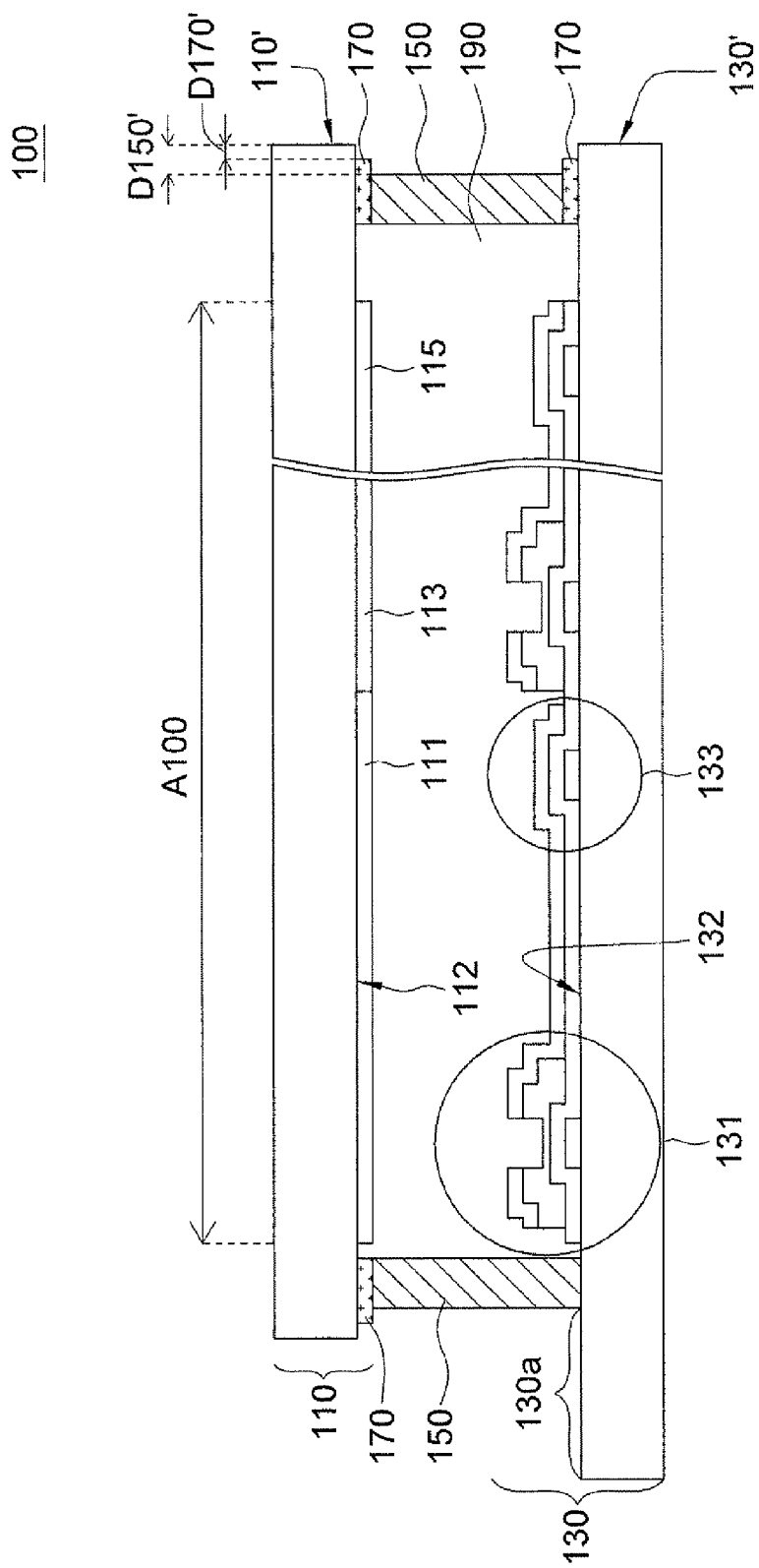
FIG. 3 shows a cross-sectional view of a display panel according to the first embodiment of the invention.

Referring to both FIG. 2A and FIG. 3. FIG. 3 shows a cross-sectional view of a display panel according to the first embodiment of the invention. Many display panels 100 are formed after the LCD mother substrate 1000 is cut. The display panel 100 comprises a color filter base plate 110 and a transistor base plate 130 opposite to the color filter base plate 110. The color filter base plate 110 is formed by cutting the color filter mother substrate 1100 along the corresponding predetermined laser cutting lines L0, L1 and L2. Similarly, the transistor base plate 130 is formed by cutting the transistor mother substrate 1300 along the corresponding predetermined laser cutting lines L0 and L2. Thus, FIG. 3 is a cross-sectional view of cutting the LCD mother substrate 1000 of FIG. 2A along the segment BB', and the edge 110' of the color filter base plate 110 of FIG. 3 is defined by cutting the color filter mother substrate 1100 along the predetermined laser cutting line L2.

The display panel 100 after cutting is illustrated in FIG. 3. Each display panel 100 has a sealant 150, a buffering metal layer 170 and a display area A100. The sealant 150 is disposed between the two base plates 110 and 130 for fixing the two base plates 110 and 130. In the present embodiment of the invention, the buffering metal layer 170 is formed on the inside surfaces 112 and 132 of the two base plates 110 and 130. Take the color filter base plate 110 for example. The buffering metal layer 170 formed on the inside surface 112 of the color filter base plate 110 is positioned between the color filter base plate 110 and the sealant 150. The first distance D170' between the rim of the buffering metal layer 170 and the edge 110' of the color filter base plate 110 as indicated in FIG. 3 is substantially identical to the first distance D170 between the rim of the buffering metal layer 170 and the predetermined laser cutting line L2 as indicated in FIG. 2B. Also, there is a third distance D150' between the rim of the sealant 150 and the edge 110' of the color filter base plate 110, and the first distance D170' is smaller than the third distance D150'.

As shown in FIG. 3, a liquid crystal layer 190 is contained among the color filter base plate 110, the transistor base plate 130 and the sealant 150. The inside surface 1100' of the color filter mother substrate 1100 (illustrated in FIG. 2B) has a color filter layer. The inside surface 1300' of the transistor mother substrate 1300 (illustrated in FIG. 2B) has many transistors arranged in an array and many metal layers connected to the transistor.

Thus, after cutting, the inside surface 112 of the color filter base plate 110 has a color filter layer, while the inside surface 132 of transistor base plate 130 has many transistors 131 arranged in an array, many capacitors 133 and many metal layers (not illustrated in the diagram) connected to the transistors 131. The color filter layer of the color filter base plate 110 has many color areas such as the red area 111, the green area 113 and the blue area 115. Each color area of the color filter base plate 110 corresponds to one transistor 131 and one capacitor 133 of the transistor base plate 130. The display panel 100 displays an image on the display area A100 by controlling the transistors 131 of each color area.

The buffering metal layer 170 positioned at the color filter base plate 110 is exemplified below. The display panel 100 further comprises a black matrix positioned on the inside surface 112 of the color filter base plate 110. The black matrix used for blocking undesirable light from entering the display area A100 is made of metal or resin. In the present embodiment, the black matrix is a metal black matrix, and the buffering metal layer may comprise the metal black matrix. In the present embodiment of the invention, the buffering metal layer 170 as shown in FIG. 3 is a metal black matrix of the color filter base plate 110.

The color filter mother substrate 1100 is cut as indicated in FIG. 2B. The predetermined laser cutting line L0 is a predetermined position for laser cutting. The laser source for laser cutting is a carbon dioxide ($CO_2$) laser light whose wavelength is approximately 10.6 μm. The $CO_2$ laser light whose wavelength corresponds to infrared light can be easily absorbed by the color filter mother substrate 1100 made of glass and is more conducive to the process of heat treatment. According to the cutting method of the color filter mother substrate 1100, an initial crack is first marked on the edge along the predetermined laser cutting line L0. Next, the laser source heats along the initial crack. When the laser source passes through the position corresponding to the predetermined laser cutting line L0 of the color filter mother substrate 1100, the molecular bonds of the glass of the color filter mother substrate 1100 will be broken along the predetermined laser cutting line L0 due to the thermal heat of the laser source. Then, the broken molecular bonds are cooled down by a cooling system (not shown). After the laser source has completely passed through the position corresponding to the predetermined laser cutting line L0 and the glass has been cooled down, the color filter mother substrate 1100 will be divided into two pieces.

Additionally, as shown in FIG. 2B, there is a third distance D150 between the rim of the sealant 150 and the predetermined laser cutting line L0, and the first distance D170 is smaller than the third distance D150. The third distance D150 of FIG. 2B is substantially identical to the third distance D150' between the rim of the sealant 150 and the edge 110' of the color filter base plate 110 as indicated in FIG. 3. When the laser source reaches the position point P0 of the predetermined laser cutting line L0, the heat generated from the laser source will be radiated from the position point P0. As the partial area 170b of the buffering metal layer 170 is projected outside the sealant 150, the area 170b of the buffering metal layer 170 is the first portion to receive the thermal energy transmitted from the position point P0 via the color filter mother substrate 1100. The buffering metal layer 170 being a metal material has excellent heat conduction, so that the heat of the laser source is transmitted from the area 170b of the buffering metal layer 170 to the area 170a. That is, most of the heat radiated from the color filter mother substrate 1100 is absorbed, transmitted and dissipated by the buffering metal layer 170. Thus, the buffering metal layer 170 is capable of protecting the sealant 150 and other organic material from absorbing the heat and being damaged by the absorbed heat.

Normally, the third distance D150 between the rim of the sealant 150 and the predetermined laser cutting line L0 ranges between about 300~500 μm. In the embodiments of the invention, the first distance D170 between the rim of the buffering metal layer 170 and the predetermined laser cutting line L0 is at least about 5 μm, or is in a preferable range of about 5~300 μm, 5~200 μm, or 5~100 μm. When the invention is applied for laser-cutting a thin base plate, or applied in a structural design with very narrow the third distance D150 between the rim of the sealant 150 and the predetermined laser cutting line L0, the first distance D170 between the rim of the buffering metal layer 170 and the predetermined cutting line L0 could preferably range between about 5~20 μm to avoid the sealant or the organic material disposed close to the cutting line being damaged by laser heat.

<Disposition of Buffering Metal Layer on Color Filter Mother Substrate>

Figure 4:
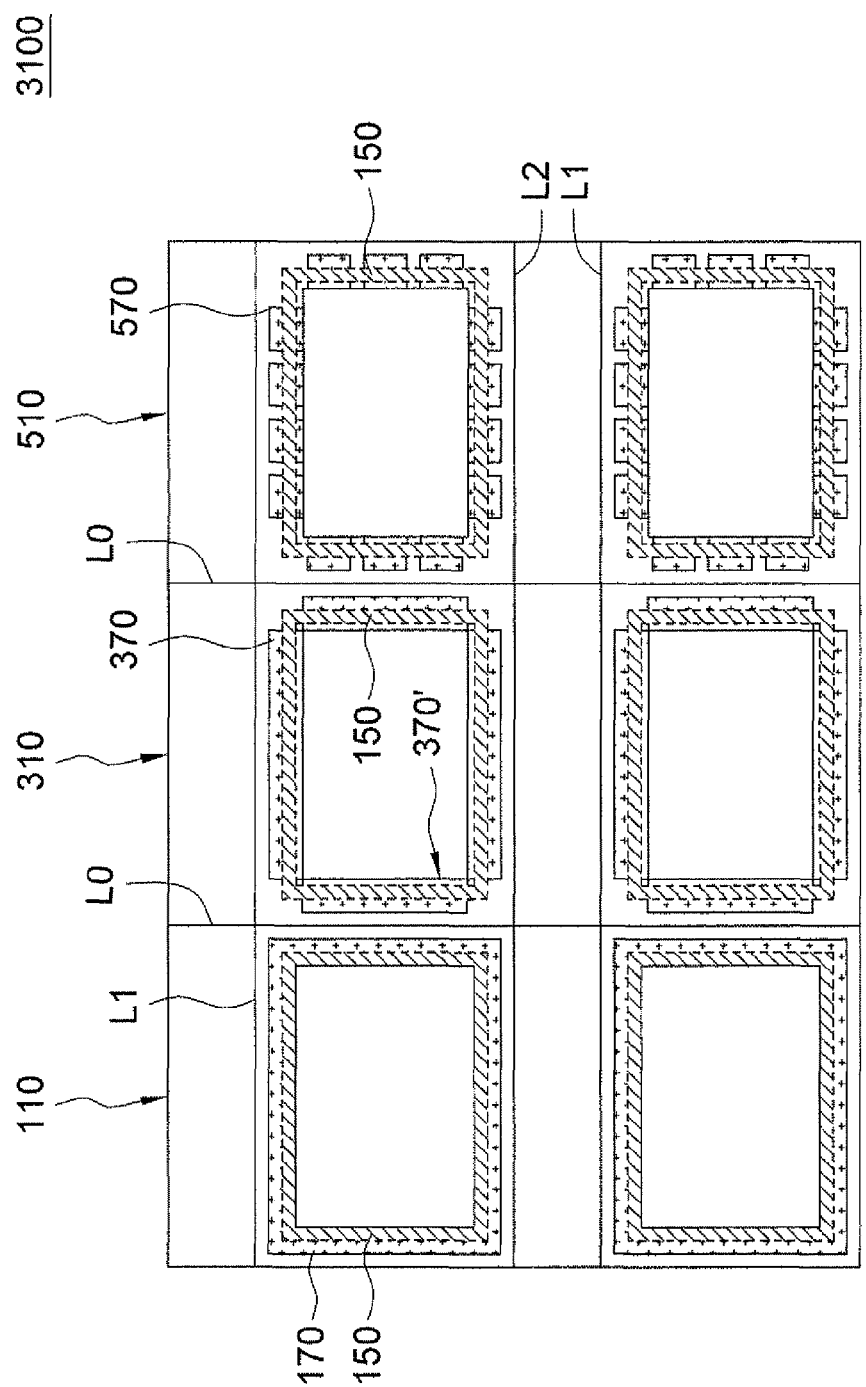
FIG. 4 shows a top view of the buffering metal layer and the sealant of the first embodiment of the invention on a color filter mother substrate.

When a buffering metal layer and a sealant are disposed on a color filter mother substrate, the relative relationship between the buffering metal layer and the sealant is disclosed below. Referring to FIG. 4, a top view of the buffering metal layer and the sealant of the first embodiment of the invention on a color filter mother substrate is shown. A color filter mother substrate 3100 is divided into many color filter base plates 110, 310 and 510 along the predetermined laser cutting lines L0, L1 and L2. The patterns of the buffering metal layers disposed on the color filter base plate 110, 310 and 510 could be the same or different. For example, the buffering metal layer 170 at the color filter base plate 110 is a rectangular-frame metal layer, and the sealant 150 is disposed along the inner side of the rectangular-frame buffering metal layer 170. In the color filter base plate 310, the buffering metal layer 370 has four metal strips disposed around the color filter base plate 310, the width of the buffering metal layer 370 is sufficient for covering the width of the sealant 150, and there is a distance between the inner edge of the sealant 150 and the inner side 370' of the buffering metal layer 370. In the color filter base plate 510, the buffering metal layer 570 includes many separate metal segments. The sealant 150 is disposed inside the metal segments of the buffering metal layer 570. The color filter mother substrate 3100 cut into the color filter base plates 110, 310 and 510 with different structural designs is taken for the exemplifications; however, the invention is not limited thereto. The color filter mother substrate can also be cut into many color filter base plates with identical structural designs.

Therefore, any buffering metal layer 170 whose rim is closer to the predetermined laser cutting line L0 than the rim of the sealant 150 (as shown in FIG. 2B) so that the heat generated during laser cutting can be absorbed, transmitted and dissipated for protecting the sealant 150 can be used as the buffering metal layer of the embodiments of the invention. As indicated in FIG. 4, there are three design patterns regarding to the shape of the buffering metal layer and the relative position between the buffering metal layer and the sealant. Anyone who understands the technology of the invention can make necessary adjustments and modifications to fit actual needs in practical applications, and the present invention is not limited to the pattern exemplifications in FIG. 4.

<Disposition of Buffering Metal Layer on Transistor Mother Substrate>

Moreover, the buffering metal layer 170 of FIG. 3 could be disposed on the color filter base plate 110 as disclosed above, or formed on the inside surface 132 of the transistor base plate 130. That is, the buffering metal layer 170 is positioned between the transistor base plate 130 and the sealant 150. The cross-sectional structure and characteristics of the buffering metal layer 170 positioned on the inside surface 132 of the transistor base plate 130 are the same as the buffering metal layer 170 formed on the color filter base plate 110, and are not repeatedly described here.

Figure 5:
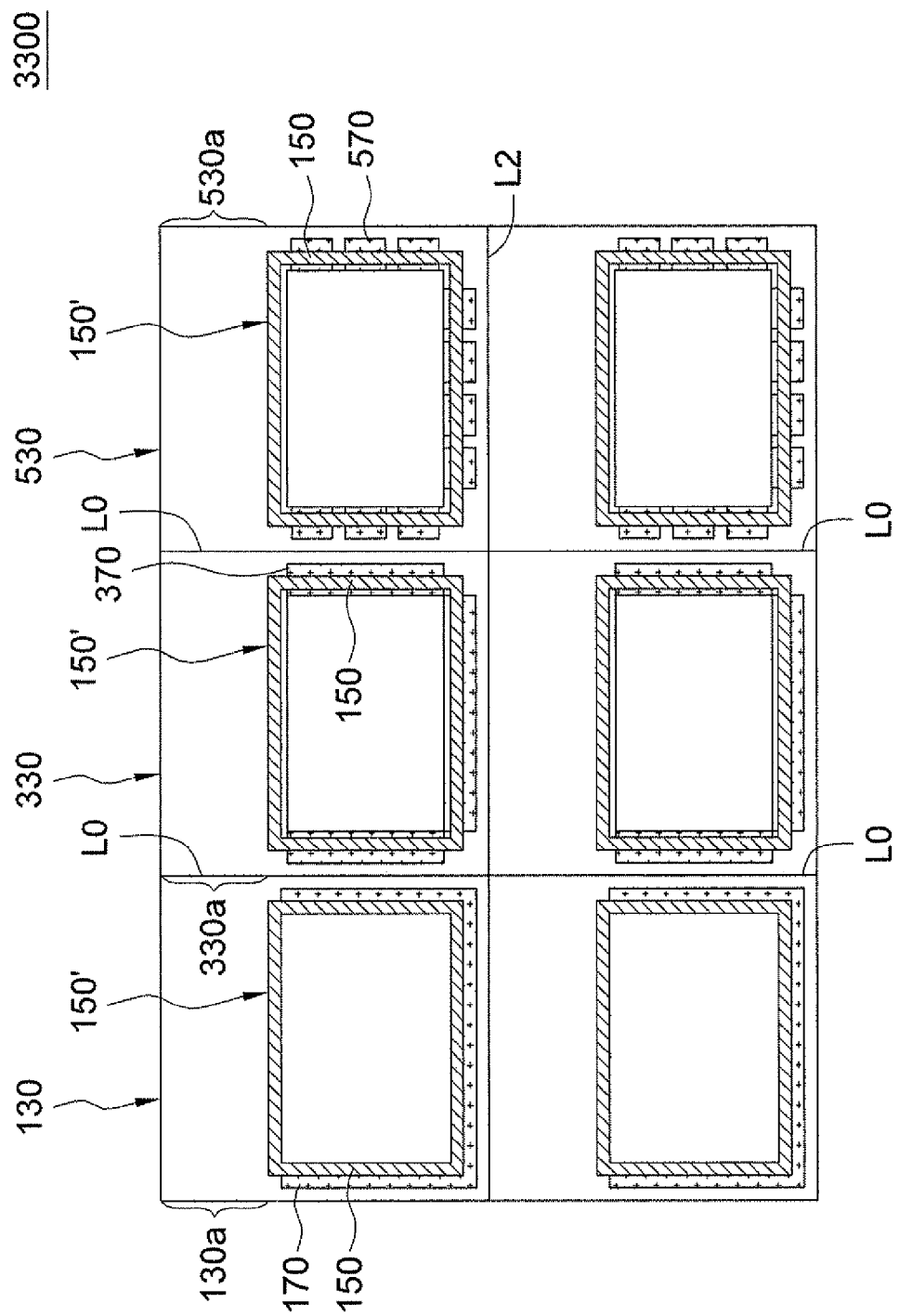
FIG. 5 shows a top view of the buffering metal layer and the sealant formed on a transistor mother substrate according to the first embodiment of the invention.

When a buffering metal layer and a sealant are disposed on a transistor mother substrate, the relative relationship between the buffering metal layer and the sealant is disclosed below. FIG. 5 is a top view of the buffering metal layer and the sealant formed on a transistor mother substrate according to the first embodiment of the invention. The transistor mother substrate 3300 may be cut into many identical or different transistor base plates along the predetermined laser cutting lines L0 and L2. In the present embodiment of the invention, the transistor mother substrate 3300 is cut into many different transistor base plates 130, 330 and 530. The relative position between each of the buffering metal layers 170, 370 and 570 and the sealant 150 is the same with the color filter mother substrate 3100 of FIG. 4 and is not repeatedly described here.

The transistor base plates 130, 330 and 530 respectively have corresponding IC bonding areas 130a, 330a and 530a. It is noted that the transistor mother substrate 3300 of FIG. 5 differs from the color filter mother substrate 3100 of FIG. 4 in that the transistor mother substrate 3300 of FIG. 5 does not have the predetermined laser cutting line L1 like the color filter mother substrate 3100 of FIG. 4. Also, the IC bonding area 130a, 330a and 530a of the transistor mother substrate 3300 of FIG. 5 have electrical pads and need wires for electrical connecting. Thus, the buffering metal layers 170, 370 and 570 are not disposed on the side near the IC bonding areas 130a, 330a and 530a, that is, the side 150' of the sealant 150. As indicated in FIG. 3, after cutting, the IC bonding area 130a of the transistor base plate 130 of the display panel 100 is projected more than the color filter base plate 110 is.

According to the display panel and the mother substrate thereof disclosed in the first embodiment of the invention, the partial area 170b of the buffering metal layer 170 is disposed outside the sealant 150 to protect the LCD mother substrate 1000 during laser cutting and avoids the sealant 150 being damaged by the heat provided by the laser source. Preferably, the buffering metal layer 170 is a metal black matrix for the color filter base plate 110 and the transistor base plate 130. The buffering metal layer 170 not only protects the sealant 150 but also blocks undesirable light from entering the display area A100.

Second Embodiment

The LCD panel and the mother substrate thereof of the second embodiment of the invention differ from that of the first embodiment in that the black matrix of the second embodiment of the invention is a resin black matrix. As for other similarities, the same designations are used and are not repeatedly described here.

Figure 6:
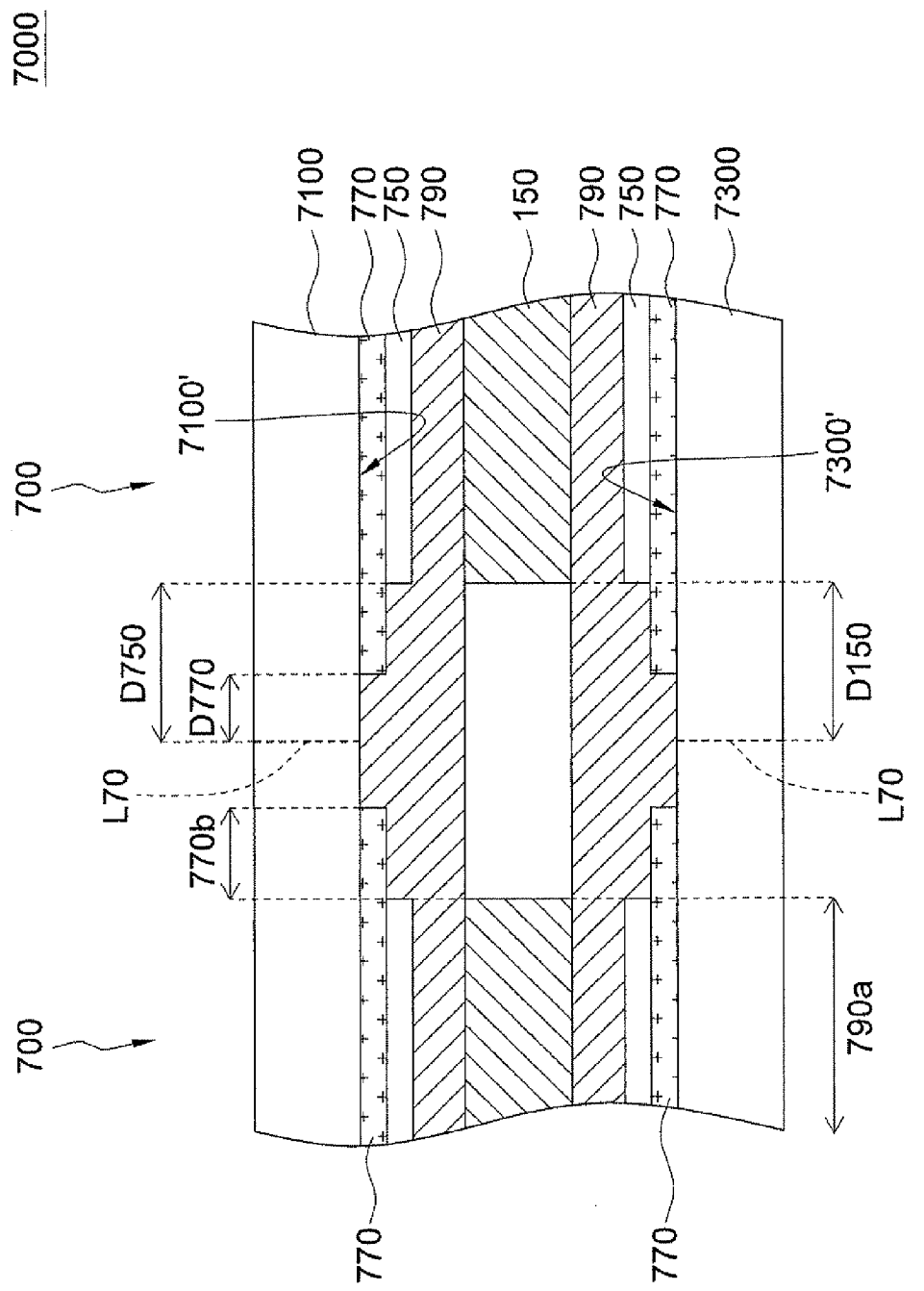
FIG. 6 shows a cross-sectional view of an LCD mother substrate close to a predetermined laser cutting line according to the second embodiment of the invention.

Referring to FIG. 6, a cross-sectional view of an LCD mother substrate close to a predetermined laser cutting line according to the second embodiment of the invention is shown. The LCD mother substrate 7000 could be cut into many display panels 700. The LCD mother substrate 7000 further comprises a color filter mother substrate 7100, a transistor mother substrate 7300, a sealant 150, a resin black matrix 750 and a buffering metal layer 770. Each of the color filter mother substrate 7100 and the transistor mother substrate 7300 has a predetermined laser cutting line L70. The sealant 150 is disposed between two mother substrates 7100 and 7300 and positioned on the inner side of the corresponding predetermined cutting line L70. There is a first distance between D770 between the rim of the buffering metal layer 770 and the predetermined cutting line L70. The resin black matrix 750 is an organic material which may easily be damaged by laser heat.

In the present embodiment of the invention, the buffering metal layer 770 is formed on the inside surface 7100' of the color filter mother substrate 7100 and on the inside surface 7300' of the transistor mother substrate 7300 for illustration.

Please refer to the color filter mother substrate 7100 of FIG. 6. The resin black matrix 750 is positioned on the inside surface 7100' of the color filter mother substrate 7100, and the resin black matrix 750 positioned between the sealant 150 and the color filter mother substrate 7100 is separated from the color filter mother substrate 7100 by the buffering metal layer 770. The resin black matrix 750 disposed on the side of the color filter mother substrate 7100 is used for blocking the light from entering the display area of the display device 700. There is a second distance D750 between the rim of the resin black matrix 750 and the predetermined laser cutting line L70, and the first distance D770 is smaller than the second distance D750. The second distance D750 is substantially identical to the third distance D150 between the rim of the sealant 150 and the predetermined laser cutting line L70. The partial area 770b of the buffering metal layer 770 is projected from the resin black matrix 750 to protect the resin black matrix 750 from being damaged by the heat provided by the laser source during laser cutting.

Besides, the LCD mother substrate 7000 further comprises an organic protection layer (such as an overcoat) 790 positioned on the inside surface 7100' of the color filter mother substrate 7100. The partial area 790a of the organic protection layer 790 positioned between the sealant 150 and the color filter mother substrate 7100 is separated from color filter mother substrate 7100 by the buffering metal layer 770. The buffering metal layer 770 is used for protecting the partial area 790a of the organic protection layer 790 corresponding to the sealant 150 from being damaged by the heat generated from the laser source during laser cutting.

Moreover, the structure and relative relationship among the buffering metal layer 770, the resin black matrix 750 and the organic protection layer 790 of the transistor mother substrate 7300 refer to the elaboration of the color filter mother substrate 7100 disclosed above. For example, the organic protection layer 790 is positioned on the inside surface 7300' of the transistor mother substrate 7300, and the partial area 790a of the organic protection layer 790 positioned between the sealant 150 and the transistor mother substrate 7300 is separated from the transistor mother substrate 7300 by the buffering metal layer 770, and other similarities are not repeatedly described here.

Figure 7:
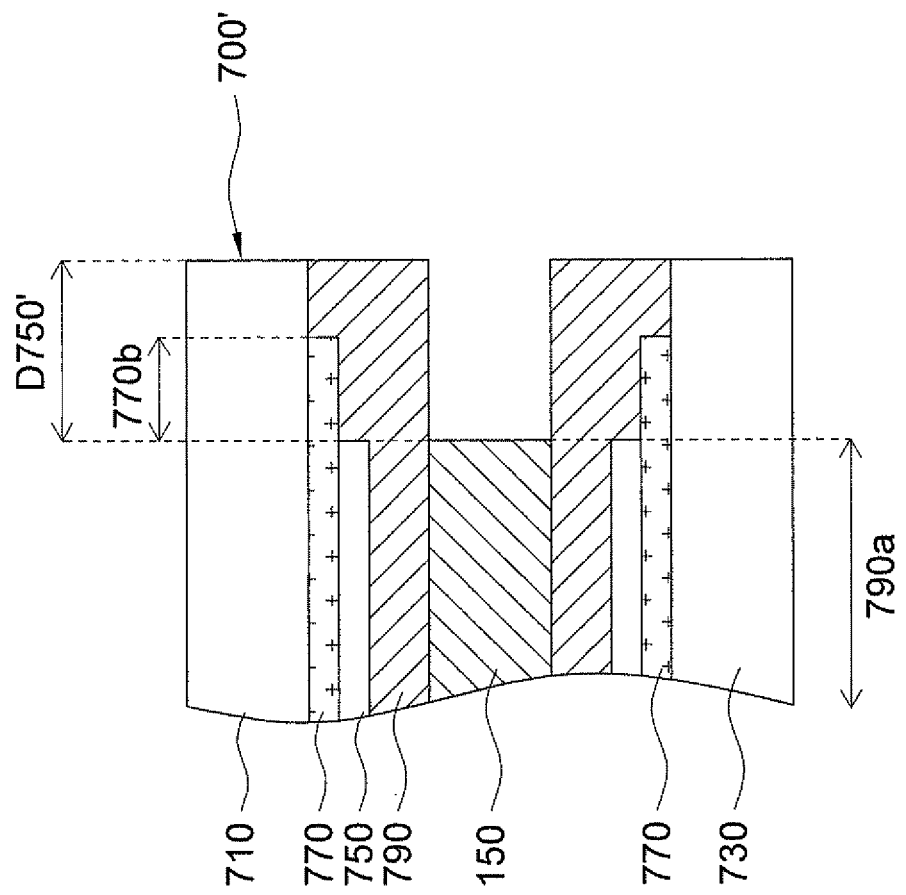
FIG. 7 shows a partial cross-sectional view of a single LCD panel formed by cutting the LCD mother substrate of the second embodiment of the invention.

Please refer to both FIG. 6 and FIG. 7. FIG. 7 shows a partial cross-sectional view of a single LCD panel formed by cutting the LCD mother substrate of the second embodiment of the invention. Many display panels 700 are obtained after laser cutting the LCD mother substrate 7000 along the predetermined cutting line L70 of FIG. 6. After laser cutting, the original position of the predetermined laser cutting line L70 of FIG. 6 corresponds to the edge 700' of the display panel 700 of FIG. 7. There is a second distance D750' (FIG. 7) between the rim of resin black matrix 750 and the edge 700' of the display panel 700. The second distance D750' is substantially identical to the second distance D750 (FIG. 6) between the rim of the resin black matrix 750 and the predetermined laser cutting line L70. After cutting, each display panel 700 has many elements such as the resin black matrix 750 and the organic protection layer 790, and relevant positions and connecting relationship of these elements are the same as that in FIG. 6, and are not repeatedly described here.

According to the display panel and the mother substrate thereof disclosed in the second embodiment of the invention, a buffering metal layer 770 is disposed between a resin black matrix 750 and a base plate to avoid the laser heat from damaging the organic material (such as the resin black matrix 750 or the organic protection layer 790) disposed under the base plate. The buffering metal layer 770 of the present embodiment of the invention has a partial area 770b of the buffering metal layer 770 projected from the sealant 150 and the resin black matrix 750, so that the heat provided by the laser source is absorbed, transmitted and dispersed by the buffering metal layer 770. Thus, the buffering metal layer 770 protects the resin black matrix 750, the sealant 150 and the partial area 790a of the organic protection layer 790 corresponding to the sealant 150 from being damaged by the heat. The first distance between the rim of the buffering metal layer 770 and the edge of the base plate/predetermined cutting line, like the range disclosed in the first embodiment, is at least about 5 μm; for example, the first distance ranges between about 5~300 μm, or about 5~200 μm, or about 5~100 μm. When the invention is applied in a super thin base plate or when the distance between the rim of the sealant 150 and the predetermined cutting line L70 is very tiny, the first distance between the rim of the buffering metal layer 770 and the edge of the base plate/predetermined cutting line could be preferably set to be about 5~20 μm.

According to the display panel and the mother substrate thereof disclosed in the above embodiments of the invention, the edge of the buffering metal layer is closer to the edge of the display panel than the sealant after laser cutting, so as to avoid the sealant being damaged by the heat. However, the buffering metal layer may further be used to protect other materials (such as the organic material) which cannot resist the heat. Any designs enabling the partial area of the buffering metal layer to be closer to the predetermined cutting line of the LCD mother substrate than these materials which cannot resist the heat so as to absorb the heat and protect these non-heat-resisting materials are within the scope of protection of the invention.

Furthermore, if a metal black matrix is adopted in the display panel structure, the original manufacturing process of metal black matrix is incorporated with the concept of the buffering metal layer of the invention to protect the non-heat-resisting materials. If a resin black matrix is adopted in the display panel structure, the buffering metal layer of the invention would be preferably formed between the resin black matrix and the base plate for the purpose of protection.

According to the display panel and the mother substrate using the same disclosed in the above embodiments of the invention, the buffering metal layer protects the organic material of the display panel from being damaged by the heat during the laser cutting of the LCD mother substrate. Particularly, when the transistor mother substrate or color filter mother substrate of the LCD mother substrate becomes thinner and thinner, or when the distance between the rim of the sealant LCD mother substrate and the predetermined laser cutting line becomes smaller and smaller, the buffering metal layer of the invention is capable of protecting the sealant or other organic materials from being damaged by the heat, so as to increase the production yield of the display panel.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) mother substrate having a plurality of LCD panels, and the LCD mother substrate comprising:
    two mother substrates opposite to each other, wherein the two mother substrates are a color filter mother substrate and a transistor mother substrate respectively, each mother substrate has an inside surface and an outer surface, the inside surfaces of the mother substrates are opposite to each other;
    a sealant disposed between the inside surfaces of the mother substrates;
    a buffering metal layer formed on the inside surface of the color filter mother substrate and disposed along the sealant, wherein at least a portion of the buffering metal layer is positioned outside the sealant; and
    a resin black matrix positioned on the inside surface of the color filter mother substrate, and the resin black matrix is positioned between the buffering metal layer and the sealant.

2. The LCD mother substrate according to claim 1, wherein the buffering metal layer is positioned between the color filter mother substrates and the sealant.

3. The LCD mother substrate according to claim 1, wherein the inside surface of the color filter mother substrate has a color filter layer, and the inside surface of the transistor mother substrate has a plurality of transistors arranged in an array and a plurality of metal layers connected to the transistors.

4. The LCD mother substrate according to claim 1, wherein the at least a portion of the buffering metal layer is positioned outside the sealant, accordingly enabling a cutting line to be defined on one of the outer surfaces of the mother substrates outside the buffering metal layer and the sealant and separated by a first distance from an edge of the buffering metal layer.

5. The LCD mother substrate according to claim 4, wherein the first distance ranges between 5~300 μm.

6. The LCD mother substrate according to claim 4, wherein the first distance ranges between 5~200 μm.

7. The LCD mother substrate according to claim 4, wherein the first distance ranges between 5~100 μm.

8. The LCD mother substrate according to claim 4, wherein the first distance ranges between 5~20 μm.

9. The LCD mother substrate according to claim 1, wherein the buffering metal layer comprises a metal black matrix positioned on the inside surface of the color filter mother substrate.

10. The LCD mother substrate according to claim 1, wherein a second buffering metal layer is positioned on the inside surface of the transistor mother substrate.

11. The LCD mother substrate according to claim 10, further comprising an organic protection layer positioned on the inside surface of the transistor mother substrate, and the organic protection layer is positioned between the second buffering metal layer and the sealant.

12. The LCD mother substrate according to claim 4, wherein there is a second distance between the resin black matrix and the cutting line, and the first distance is smaller than the second distance.

13. The LCD mother substrate according to claim 4, wherein there is a second distance between an edge of the sealant and the cutting line, and the first distance is smaller than the third distance.

14. The LCD mother substrate according to claim 4, wherein the cutting line is a predetermined position for laser cutting.

* * * * *